(12) United States Patent
Sumiya et al.

(10) Patent No.: US 8,561,931 B2
(45) Date of Patent: Oct. 22, 2013

(54) RECORDING TAPE CARTRIDGE

(75) Inventors: Yosuke Sumiya, Kanagawa (JP); Shozo Onmori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 398 days.

(21) Appl. No.: 12/886,587

(22) Filed: Sep. 21, 2010

(65) Prior Publication Data

US 2011/0075296 A1  Mar. 31, 2011

(30) Foreign Application Priority Data

Sep. 28, 2009 (JP) .................................. 2009-223217
Apr. 9, 2010 (JP) .................................. 2010-090601

(51) Int. Cl.
*G03B 23/02* (2006.01)
*G11B 23/107* (2006.01)

(52) U.S. Cl.
USPC .......................... 242/348; 242/332.4; 242/912

(58) Field of Classification Search
USPC ............ 242/332.4, 338, 338.1, 343, 344, 348, 242/348.2, 912, 347; 360/132
See application file for complete search history.

(56) References Cited

U.S. PATENT DOCUMENTS

| | | | | |
|---|---|---|---|---|
| 6,304,416 | B1 * | 10/2001 | McAllister et al. | 360/132 |
| 6,702,215 | B2 * | 3/2004 | Stamm et al. | 242/348 |
| 7,516,913 | B2 * | 4/2009 | Ashikawa | 242/348 |
| 7,530,515 | B2 * | 5/2009 | Battles et al. | 242/332.4 |
| 7,770,835 | B2 * | 8/2010 | Sumiya et al. | 242/348 |
| 7,780,107 | B2 * | 8/2010 | Onmori et al. | 242/348 |
| 7,918,412 | B2 * | 4/2011 | Takenoshita et al. | 242/348 |
| 2003/0002214 | A1 * | 1/2003 | Kitamura et al. | 360/132 |
| 2007/0058290 | A1 * | 3/2007 | Tada et al. | 242/348 |
| 2007/0262876 | A1 * | 11/2007 | Marsilio et al. | 340/572.8 |
| 2009/0242680 | A1 * | 10/2009 | Onmori et al. | 242/348 |
| 2009/0242682 | A1 * | 10/2009 | Takenoshita et al. | 242/348 |

FOREIGN PATENT DOCUMENTS

| | | |
|---|---|---|
| JP | H05-69278 | 3/1993 |
| JP | 2001-291355 | 10/2001 |
| JP | 2008-090942 A | 4/2008 |
| JP | 2009-129531 | 6/2009 |

OTHER PUBLICATIONS

Partial English language translation of the following: Office action dated Sep. 3, 2013 from the JPO in a Japanese patent application corresponding to the instant patent application. This office action translation is submitted now in order to supplement the understanding of patent document JP 2009-129531, JPH05-69278 and JP2001-291355 which are cited in the office action and are being disclosed in the instant information Disclosure Statement.

* cited by examiner

*Primary Examiner* — William A Rivera
(74) *Attorney, Agent, or Firm* — SOLARIS Intellectual Property Group, PLLC

(57) ABSTRACT

A recording tape cartridge in which an ability to assemble a security tag into a case is excellent is provided. A recording tape cartridge includes: a case that accommodates a reel on which a recording tape is wound; a security tag having a substantially pillar shape, that is provided within the case, and that is adapted to transmit to and receive from an exterior; and a holding portion formed in the case, that holds the security tag by having the security tag fitted with the holding portion.

10 Claims, 14 Drawing Sheets

RECORDING TAPE CARTRIDGE

CROSS-REFERENCE TO RELATED APPLICATION

This application claims priority under 35 USC 119 from Japanese Patent Applications No. 2009-223217 filed Sep. 28, 2009 and 2010-090601 filed Apr. 9, 2010, the disclosures of which are incorporated by reference herein.

BACKGROUND

1. Technical Field

The present invention relates to a recording tape cartridge having a reel on which a recording tape, such as a magnetic tape or the like, is wound, and more particularly, relates to a recording tape cartridge equipped with a security function.

2. Related Art

Recording tape cartridges are conventionally known in which a recording tape such as a magnetic tape or the like is wound on a reel, and that accommodate the single reel within a case. Because such a recording tape cartridge is often used as a data recording/playback medium (a data backup medium) for computers or the like, there are cases in which security measures for theft prevention are applied to the recording tape cartridge.

For example, a security tag, that can transmit and receive to and from the exterior, is provided within the case of a recording tape cartridge such that, when the recording tape cartridge is transported-out from a predetermined security area, an alarm sound is issued from a gate or the like provided at the entrance/exit of that security area, such that theft of the recording tape cartridge is psychologically prevented (see, for example, Japanese Patent Application Laid-Open (JP-A) No. 2008-90942).

However, the security tag disclosed in JP-A No. 2008-90942 is accommodated within a housing container, and the housing container is provided within a case by being fixed to a columnar projection of the case by a bush and a nut, heat caulking, or the like. Accordingly, there is the drawback that the process for assembling the security tag into the case is bothersome.

SUMMARY

In view of the above-described circumstances, the present invention is to provide a recording tape cartridge in which the ability to assemble a security tag into a case is excellent.

A recording tape cartridge of a first aspect of the present invention includes: a case that accommodates a reel on which a recording tape is wound; a security tag having a substantially pillar shape, that is provided within the case, and that is adapted to transmit to and receive from an exterior; and a holding portion formed in the case, that holds the security tag by having the security tag fitted with the holding portion.

In accordance with the first aspect, with the security tag being fit with the holding portion formed in the case, the security tag is held in the case. Accordingly, incorporatability (assemblility) of the security tag into the case is excellent. Further, it is not necessary to separately provide a holding member for holding the security tag, and therefore, it is possible to prevent an increase in parts production costs caused by an increase in the number of parts, and deterioration in the productivity efficiency owing to an increase in the number of assembling processes. Moreover, the holding portion is formed integrally with the case, and therefore, durability thereof is equivalent to that of the case. Accordingly, as compared to the structure in which the holding member for holding the security tag is provided separately, durability of the holding portion can be improved.

Further, in the recording tape cartridge according to a second aspect of the invention in the recording tape cartridge of the first aspect, the holding portion comprises a projection projected from the case, with which the security tag is fitted as the projection is elastically deformed.

According to the second aspect, as compared to the case in which the holding member for holding the security tag is provided separately, the security tag can be positioned and held with a higher degree of precision. Accordingly, it is possible to restrain variations in communication distance for each product and stabilize the quality.

Further, in the recording tape cartridge according to a third aspect of the invention in the recording tape cartridge according to the first aspect, the security tag is fitted with the holding portion by being pressed into the holding portion, and the holding portion comprises a guide surface that guides the security tag being pressed into the holding portion.

According to the third aspect of the invention, as compared to a case in which the holding member for holding a security tag is provided separately, the security tag can be positioned and held with a higher degree of precision. Accordingly, it is possible to restrain variations in communication distance for each product, and stabilize the quality. Further, the security tag is easily fit with the holding portion.

Moreover, in the recording tape cartridge according to a fourth aspect of the invention in the recording tape cartridge according to any one of the first and third aspects, the case comprises an upper case and a lower case, and the holding portion is formed in at least one of the upper case and the lower case.

According to the fourth aspect, the degree of freedom of the position at which the security tag is located can be enhanced. Further, the security tag is easily fit with in the holding portion.

Still further, in the recording tape cartridge according to a fifth aspect of the invention in any one of the first to fourth aspects, a recognition portion, by which it can be recognized from an exterior that the security tag is provided in the recording tape cartridge, is formed in the case.

According to the fifth aspect, it is possible to psychologically prevent the recording tape cartridge from being carried out from a predetermined security area.

Furthermore, in the recording tape cartridge according to a sixth aspect of the invention in the recording tape cartridge according to the fifth aspect, the recognition portion is formed immediately below or immediately above the holding portion.

According to the sixth aspect, the position of the security tag can be specified from the outside of the case, and therefore, it is possible to reliably carry out operation check of the security tag, and the like.

It is possible in the first aspect of the invention that the holding portion includes a plurality of projections projected from the case, the security tag being fitted between the projections as the projections are elastically deformed.

Also, in is possible that, at an upper portion of each of the projections, a tapered surface is formed that guides the security tag being pressed between the projections.

Further, in is possible in the sixth aspect of the present invention that the recognition portion is a recessed portion formed at an outer surface of the case.

Moreover, it is possible in the first aspect of the invention that a notch portion is formed in the security tag, and the notch portion is fitted with the holding portion.

As described above, the present invention can provide a recording tape cartridge which is excellent in incorporatability of a security tag into a case.

BRIEF DESCRIPTION OF THE DRAWINGS

Exemplary embodiments of the present invention will be described in detail based on the following figures, wherein.

DETAILED DESCRIPTION

Figure 1:
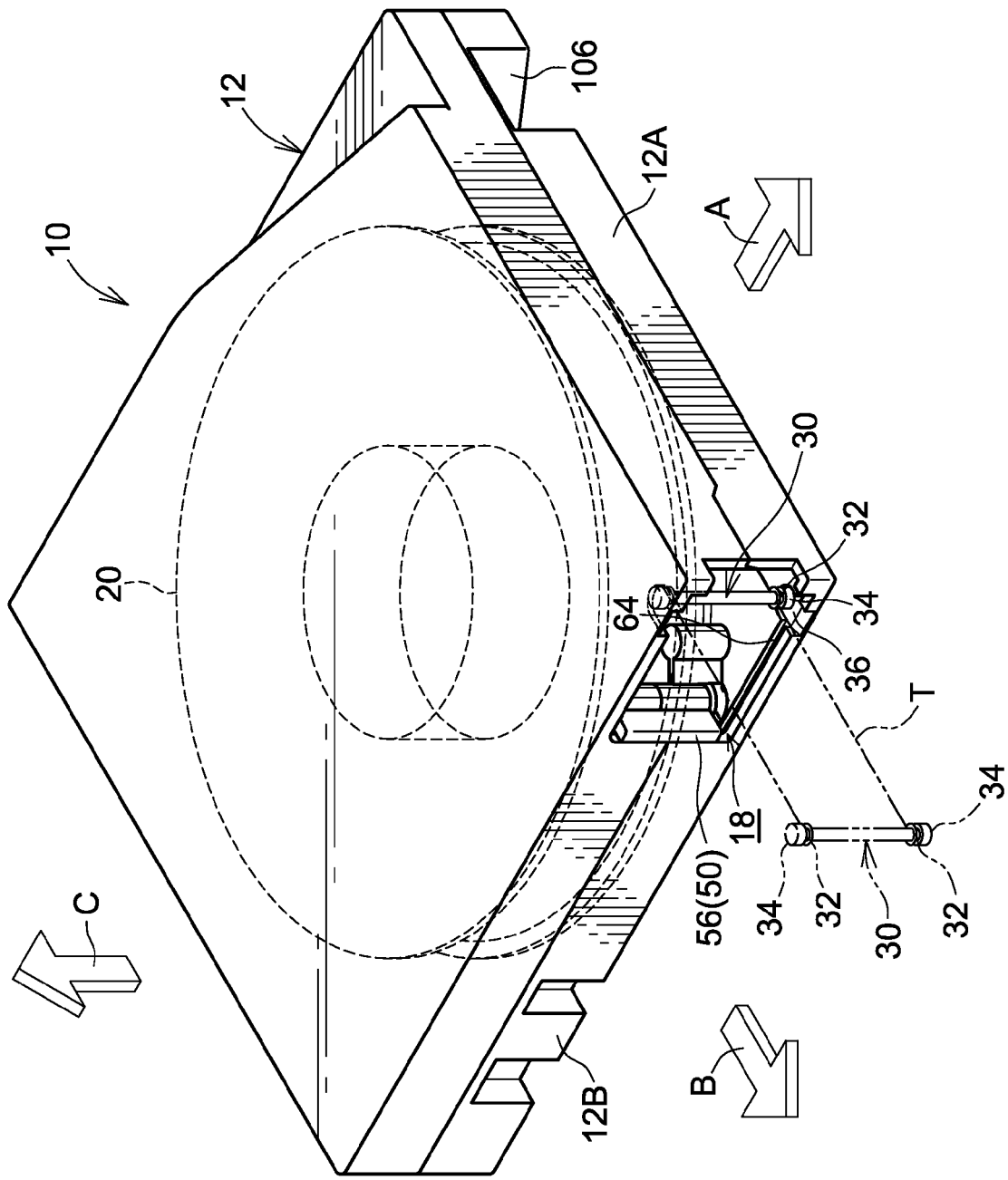
FIG. 1 is a schematic perspective view of a recording tape cartridge.

Exemplary embodiments of the present invention will be described in detail hereinafter on the basis of the examples shown in the drawings. Note that, for convenience of explanation, in FIG. 1, the direction of loading a recording tape cartridge 10 into a drive device is denoted by arrow A, and this direction of arrow A is the forward direction (front side) of the recording tape cartridge 10. Further, the direction of arrow B, that is orthogonal to arrow A, is the rightward direction (right side). The direction orthogonal to the direction of arrow A and the direction of arrow B is denoted by arrow C, and this direction of arrow C is the upward direction (top side) of the recording tape cartridge 10. First, the schematic structure of the recording tape cartridge 10 will be described.

Figure 2:
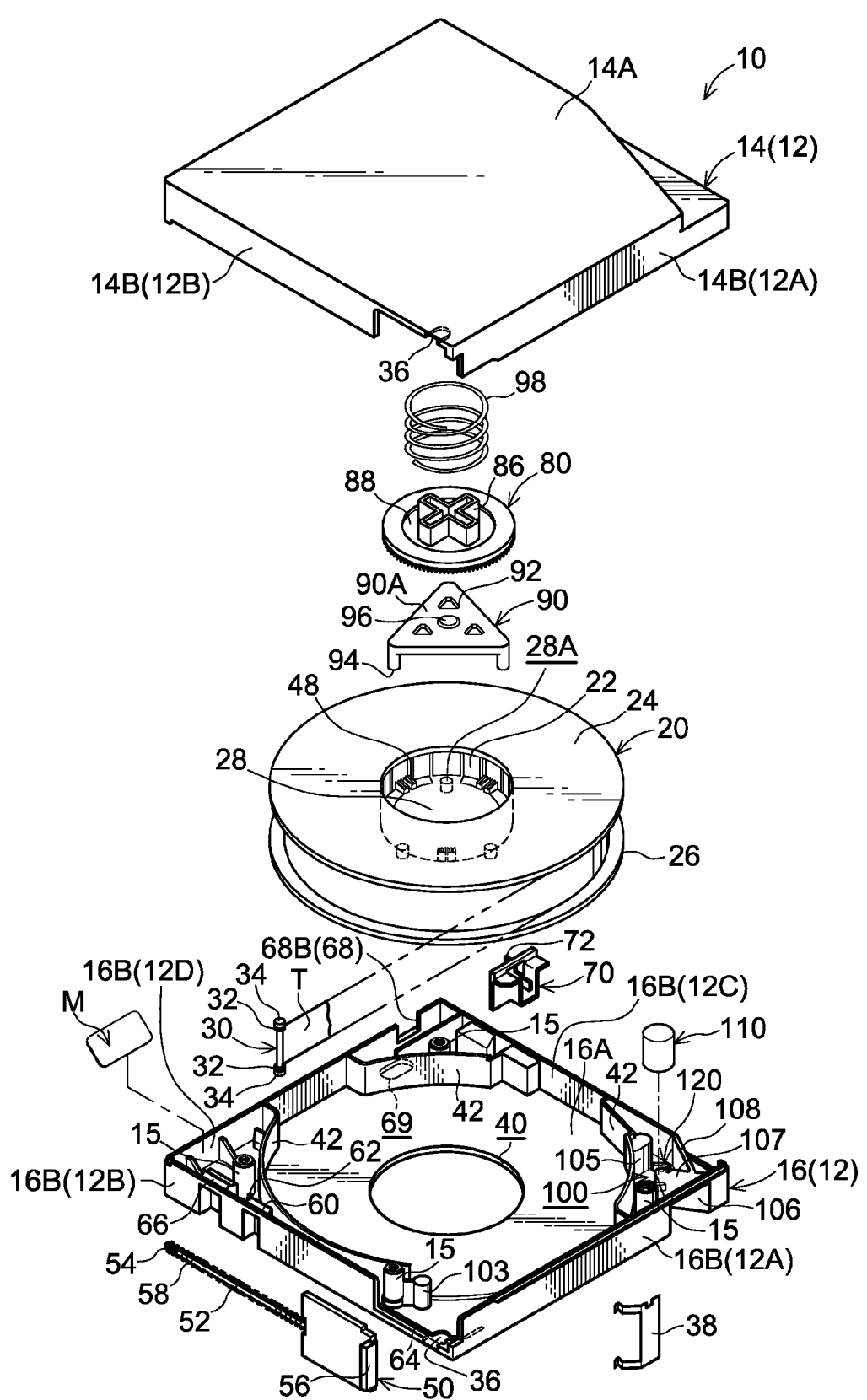
FIG. 2 is a schematic exploded perspective view when viewing a recording tape cartridge, that is provided with a holding portion relating to a first exemplary embodiment, from above.
Figure 3:
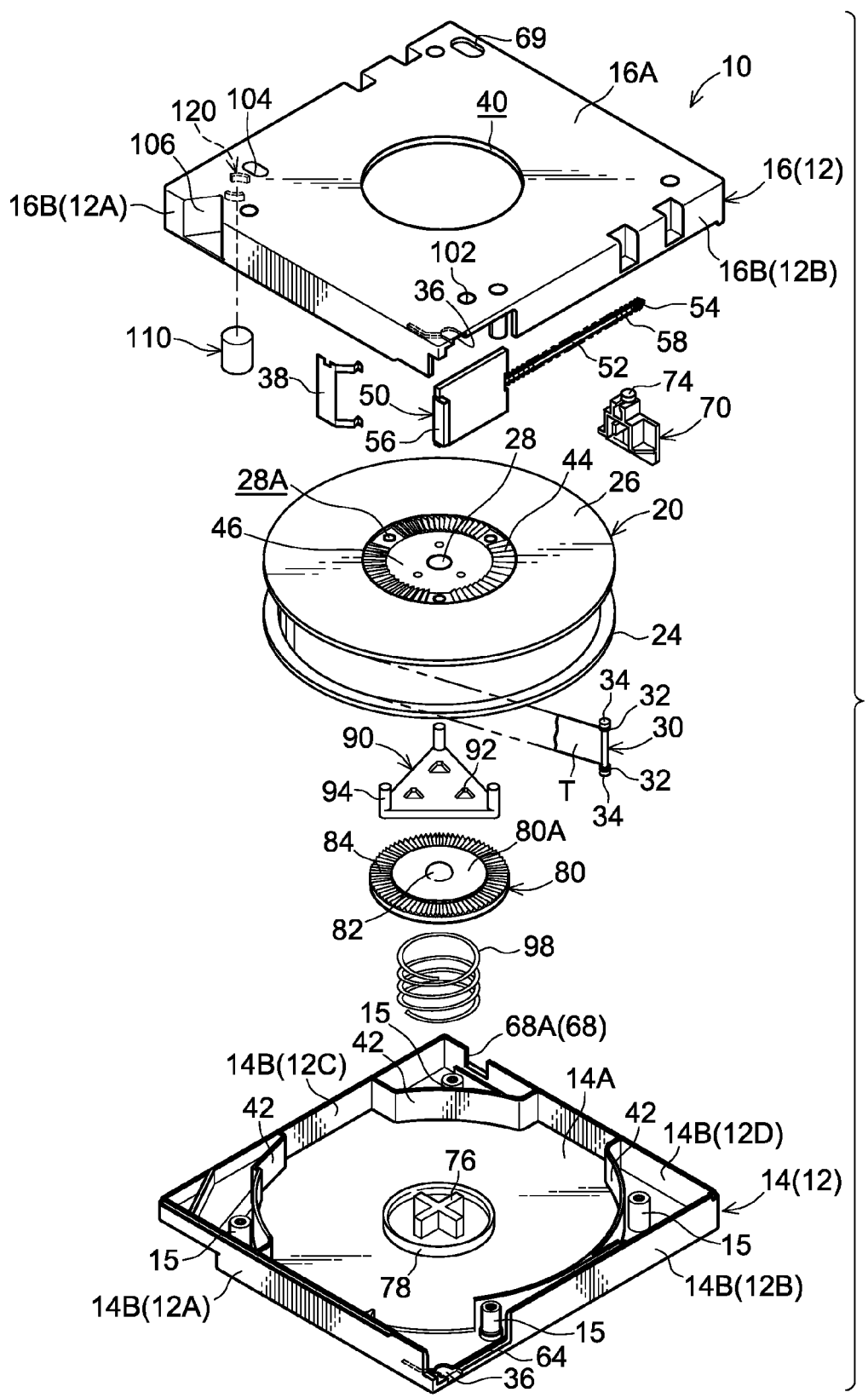
FIG. 3 is a schematic exploded perspective view when viewing the recording tape cartridge, that is provided with the holding portion relating to the first exemplary embodiment, from below.

As shown in FIG. 1 through FIG. 3, the recording tape cartridge 10 has a case 12 that is substantially shaped as a rectangular box. The case 12 is structured by an upper case 14 and a lower case 16, that are made of a synthetic resin such as polycarbonate (PC) or the like, being joined together by screws in a state in which a peripheral wall 14B, that stands erect at the peripheral edge of a ceiling plate 14A, and a peripheral wall 16B, that stands erect at the peripheral edge of a floor plate 16A, are abutting one another.

Namely, screw bosses 15 are formed in vicinities of the respective corner portions of the upper case 14 and the lower case 16. The case 12 is assembled by unillustrated screws (vis) being screwed-together with the screw bosses 15 from the bottom surface side of the lower case 16. A single reel 20 is rotatably accommodated within the case 12.

The reel 20 is structured by a reel hub 22, that is shaped as a cylindrical tube having a floor and that structures the axially central portion of the reel 20, and a lower flange 26, that is provided at the lower end portion of the reel hub 22, being molded integrally, and an upper flange 24 being ultrasonically welded to the top end portion of the reel hub 22. A recording tape T, such as a magnetic tape or the like that serves as an information recording/playback medium, is wound on the outer peripheral surface of the reel hub 22. The transverse direction end portions of the wound recording tape T are held by the upper flange 24 and the lower flange 26.

A reel gear 44 is formed in an annular shape at the bottom surface (outer surface) of a floor wall (floor portion) 28 of the reel hub 22. A gear opening 40, that is for exposing the reel gear 44 to the exterior, is formed in the central portion of the lower case 16. Due to the reel gear 44, that is exposed from the gear opening 40, meshing-together with a driving gear (not shown) formed at a rotating shaft (not shown) of a drive device and being rotated and driven thereby, the reel 20 can rotate relative to the case 12 within the case 12.

A reel plate 46, that is an annular metal plate formed of a magnetic material, is fixed integrally and coaxially by insert molding or the like to the radial direction inner side of the reel gear 44, at the bottom surface of the floor wall 28. The reel plate 46 is attracted to and held by the magnetic force of an annular magnet (not shown) that is provided at the rotating shaft of the drive device. Further, the reel 20 is held so as to not joggle by play restricting walls 42 that project out locally at the inner surfaces of the upper case 14 and the lower case 16 and that serve as inner walls that are on a circular locus that is coaxial with the gear opening 40.

An opening 18, that is for the pulling-out of the recording tape T wound on the reel 20, is formed in a right wall 12B of the case 12. A leader pin (leader member) 30, that is pulled-out and operated while being anchored (engaged) by a pull-out member (not shown) of the drive device, is fixed to the free end portion of the recording tape T that is pulled-out from the opening 18. Annular grooves 32 are formed in both end portions of the leader pin 30, that project-out further than the transverse direction end portions of the recording tape T. These annular grooves 32 are anchored by hooks or the like of the pull-out member.

A pair of upper and lower pin holding portions 36, that position and hold the leader pin 30 within the case 12, are provided at the inner side of the opening 18 of the case 12, i.e., at the inner surface of the ceiling plate 14A of the upper case 14 and the inner surface of the floor plate 16A of the lower case 16. The pin holding portions 36 form substantially semicircular shapes whose recording tape T pull-out sides are open. Both end portions 34 of the leader pin 30, that is in an upright state, can enter into and exit from the pin holding portions 36 from these open sides.

A plate spring 38 is fixedly disposed in a vicinity of the pin holding portions 36. Bifurcated distal end portions of the plate spring 38 respectively engage the upper and lower both end portions 34 of the leader pin 30, and hold the leader pin 30 at the pin holding portions 36. Note that, when the leader pin 30 is to enter into or exit from the pin holding portions 36, the distal end portions of the plate spring 38 are appropriately elastically deformed so as to permit movement of the leader pin 30.

The opening 18 is opened and closed by a door 50. The door 50 is formed in the shape of a substantially rectangular plate of a size that can close the opening 18. Groove portions 64, into which the upper and lower end portions of the door 50 are slidably fit, are formed in the ceiling plate 14A and the floor plate 16A at the inner side of the opening 18, such that the door 50 can move along the right wall 12B of the case 12.

A shaft 52 is formed to project at the center of the rear end portion of the door 50. A coil spring 58 is fit around the shaft 52. A widening portion 54, that prevents the coil spring 58 from falling-off, is formed at the rear end of the shaft 52. A supporting stand 60, that has an anchor portion 62 that anchors the rear end of the coil spring 58 fit on the shaft 52, projects from the lower case 16.

Accordingly, the shaft 52 is supported so as to be freely slidable on the supporting stand 60, and the rear end of the coil spring 58 is anchored on the anchor portion 62. The door 50 is thereby always urged in the direction of closing the opening 18 by the urging force of the coil spring 58. Note that it is preferable that a supporting stand 66, that supports the shaft 52 when the opening 18 is open, be formed at the rear side of the supporting stand 60 so as to project-out.

A convex portion 56 for opening/closing operation projects outwardly from the front end portion of the door 50. The convex portion 56 engages with an opening/closing member (not shown) of the drive device as the recording tape cartridge 10 is loaded into the drive device. The door 50 is thereby opened against the urging force of the coil spring 58.

As shown in FIG. 2 and FIG. 3, a write protect member 70, by which recording onto the recording tape T is set to be possible or impossible, is provided so as to be able to slide leftward and rightward at the rear left portion of the case 12. A hole 68, through which protrudes an operation projection 72 for manually operating the write protect member 70, is formed in a rear wall 12D of the case 12. The hole 68 is structured so as to be formed by a cut-out portion 68A, that is formed in the peripheral wall 14B of the upper case 14, and a cut-out portion 68B, that is formed in the peripheral wall 16B of the lower case 16, when the upper case 14 and the lower case 16 are joined together.

A long hole 69, through which a protrusion 74 of the write protect member 70 is exposed, is formed in the floor plate 16A of the lower case 16, so as to be long in the left-right direction. When the recording tape cartridge 10 is loaded in a drive device, the position of the write protect member 70 is sensed at the drive device, and it is automatically judged whether recording onto the recording tape T is possible or impossible. Note that the protrusion 74 does not project-out from the bottom surface of the floor plate 16A of the lower case 16.

Further, as shown in FIG. 2, a memory board M, in which is stored various types of information such as the recording capacity, the recording format and the like, is disposed at the rear right portion of the case 12 at a predetermined angle of inclination. Note that a communication distance of this memory board M is about 30 mm.

Moreover, as shown in FIG. 2 and FIG. 3, engaging gears 48 stand erect at the peripheral edge of the top surface of the floor wall 28 of the reel hub 22 so as to be spaced apart at predetermined intervals (uniform intervals). (For example, three of the engaging gears 48 are provided at intervals of 120°.) Plural through-holes 28A are formed at predetermined positions on the reel gear 44, between these engaging gears 48. (In this case, three of the through-holes 28A are formed at 120° intervals.) A circular-plate-shaped braking member 80 molded of a resin material is inserted within the reel hub 22.

A braking gear 84, that can mesh with the engaging gears 48, is formed in an annular shape at the peripheral edge of a bottom surface 80A of the braking member 80. An engaging projection 86, that is substantially cross-shaped in plan view and into which is inserted a rotation restricting rib 76 that is substantially cross-shaped in plan view and that projects-out downward from the inner surface of the ceiling plate 14A of the upper case 14, stands erect at the top surface of the braking member 80 so as to be slightly taller than the height of the rotation restricting rib 76. Due thereto, the braking member 80 can be made unable to rotate with respect to the case 12 (the upper case 14), and can move in vertical directions within the reel hub 22.

A compression coil spring 98 is disposed between the upper case 14 and the braking member 80. Namely, one end of the compression coil spring 98 abuts the inner side of an annular projection 78 that is formed to project at the outer side of the rotation restricting rib 76 of the upper case 14 (i.e., abuts the region between the rotation restricting rib 76 and the annular projection 78). The other end of the compression coil spring 98 is disposed in a state of abutting the interior of an annular groove 88 that is formed in the top surface of the braking member 80. The braking member 80 is always urged downward by the urging force of the compression coil spring 98.

Accordingly, when the recording tape cartridge 10 is not in use (is not loaded in a drive device), the braking gear 84 is always in a state of meshing-together with the engaging gears 48, and the reel 20 is in a rotation locked state in which rotation thereof relative to the case 12 is impeded. Note that, at this time, the reel 20 is pushed toward the lower case 16 by the urging force, and the reel gear 44 is exposed from the gear opening 40.

A releasing member 90, that is molded of a resin material and is substantially triangular in plan view, is inserted within the reel hub 22 at the lower side of the braking member 80 (between the floor wall 28 and the braking member 80). Plural through-holes 92, that are formed in predetermined shapes at appropriate positions (three hexagonal through-holes 92 in the illustrated structure), are formed in the releasing member 90 so as to make the releasing member 90 lighter-weight. Leg portions 94, that are inserted through the through-holes 28A and project-out a predetermined height above the reel gear 44 from the bottom surface of the floor wall 28, are formed to project at the respective vertices of the bottom surface of the releasing member 90.

A supporting convex portion 96 that is planar is formed at the center of a top surface 90A of the releasing member 90. A substantially hemispherical releasing protrusion 82, that projects-out at the center of the bottom surface 80A of the braking member 80, abuts the supporting convex portion 96 (see FIG. 2 and FIG. 3). In this way, the surface area of contact between the braking member 80 and the releasing member 90 is reduced, and the sliding resistance at the time of use (when the reel 20 rotates) is lessened.

Holes 102, 104 for positioning, into which positioning members (not illustrated) provided at the drive device are inserted when the recording tape cartridge 10 is loaded in the drive device, are formed (see FIG. 3) so as to be apart from one another in the left-right direction at the front wall 12A side of the bottom surface of the floor plate 16A of the lower case 16.

The hole 102 at the right side is formed in a substantially circular shape, and the hole 104 at the left side is formed substantially in the shape of an oval that is long in the left-right direction. Due thereto, even if the recording tape cartridge 10 is loaded in the drive device so as to be offset slightly in the left-right direction, the positioning members are reliably inserted, and the positional offset is corrected. Pocket portions 103, 105, that serve as bosses that structure the holes 102, 104, are formed at the inner surface of the floor plate 16A of the lower case 16 in convex shapes (shapes of protrusions) that protrude toward the upper case 14 side (see FIG. 2).

A recess 106 that is substantially V-shaped in bottom view is formed in the front wall 12A (the peripheral wall 16B) at the front side of the hole 104 (the pocket portion 105) of the lower case 16 (see FIG. 1 through FIG. 3). When the recording tape cartridge 10 is loaded in a drive device, a position restricting member (not shown) provided at the drive device engages with the recess 106, and the position of the recording tape cartridge 10 in the loading direction is thereby restricted.

Figure 4:
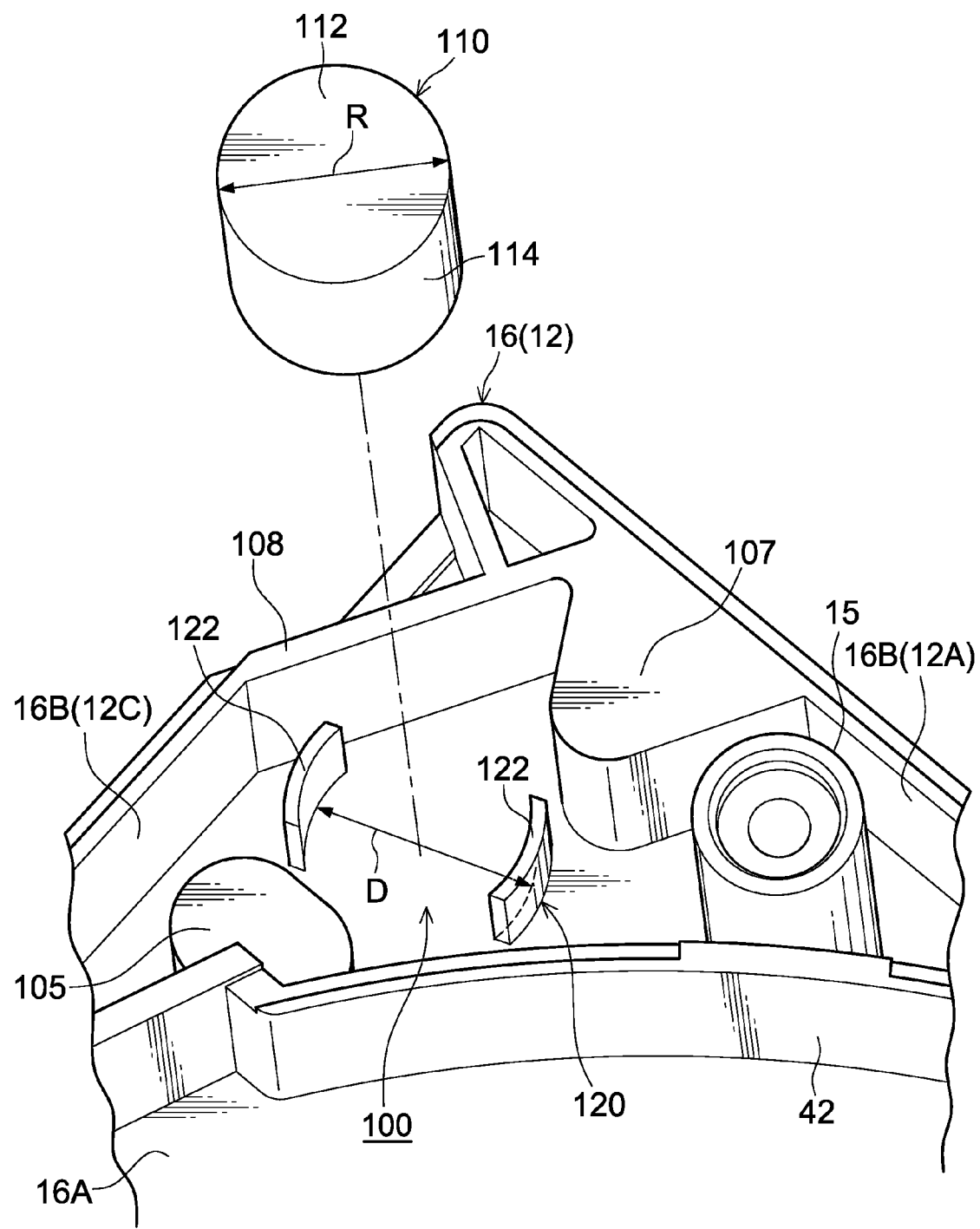
FIG. 4 is a schematic perspective view of the holding portion relating to the first exemplary embodiment.
Figure 5:
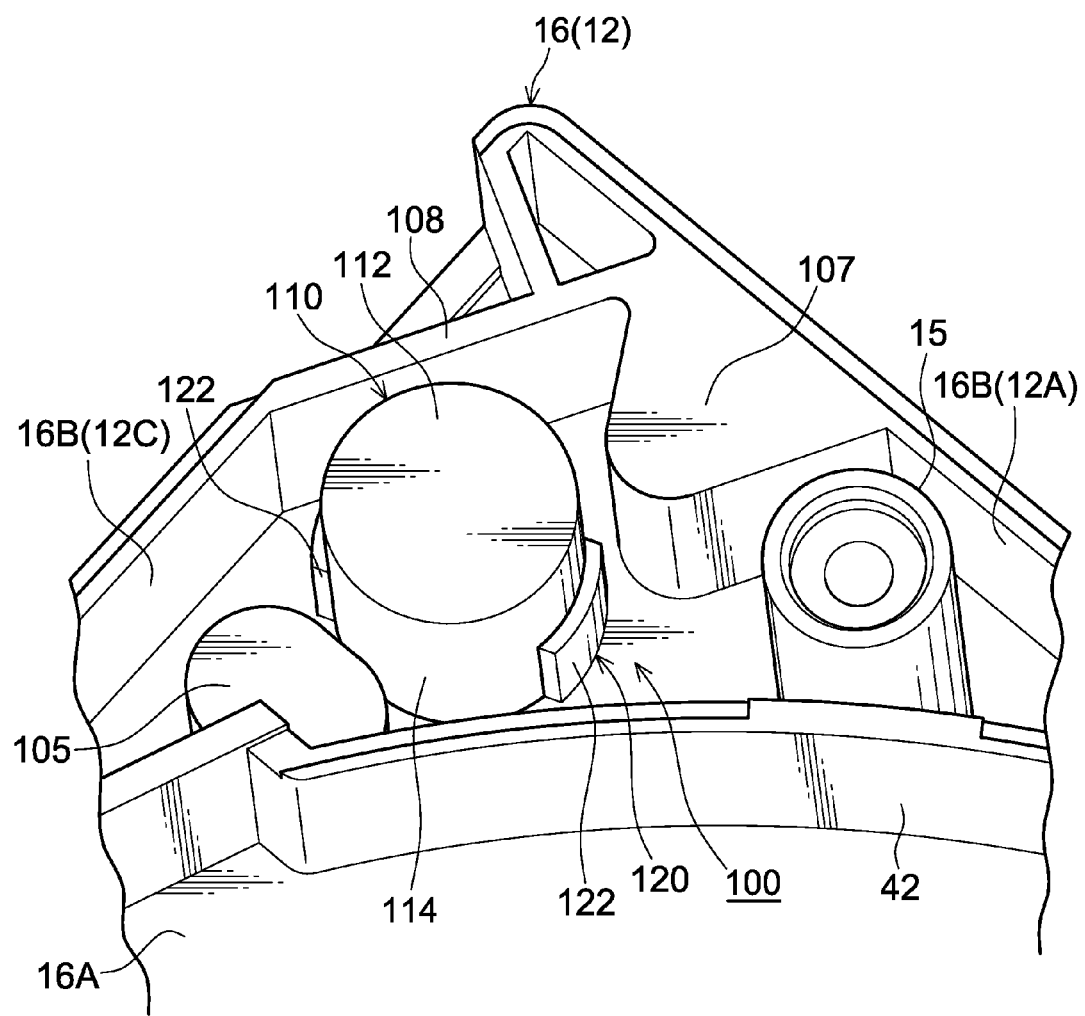
FIG. 5 is a schematic perspective view of a lower case, that shows the holding portion relating to the first exemplary embodiment that is holding a security tag.
Figure 6:
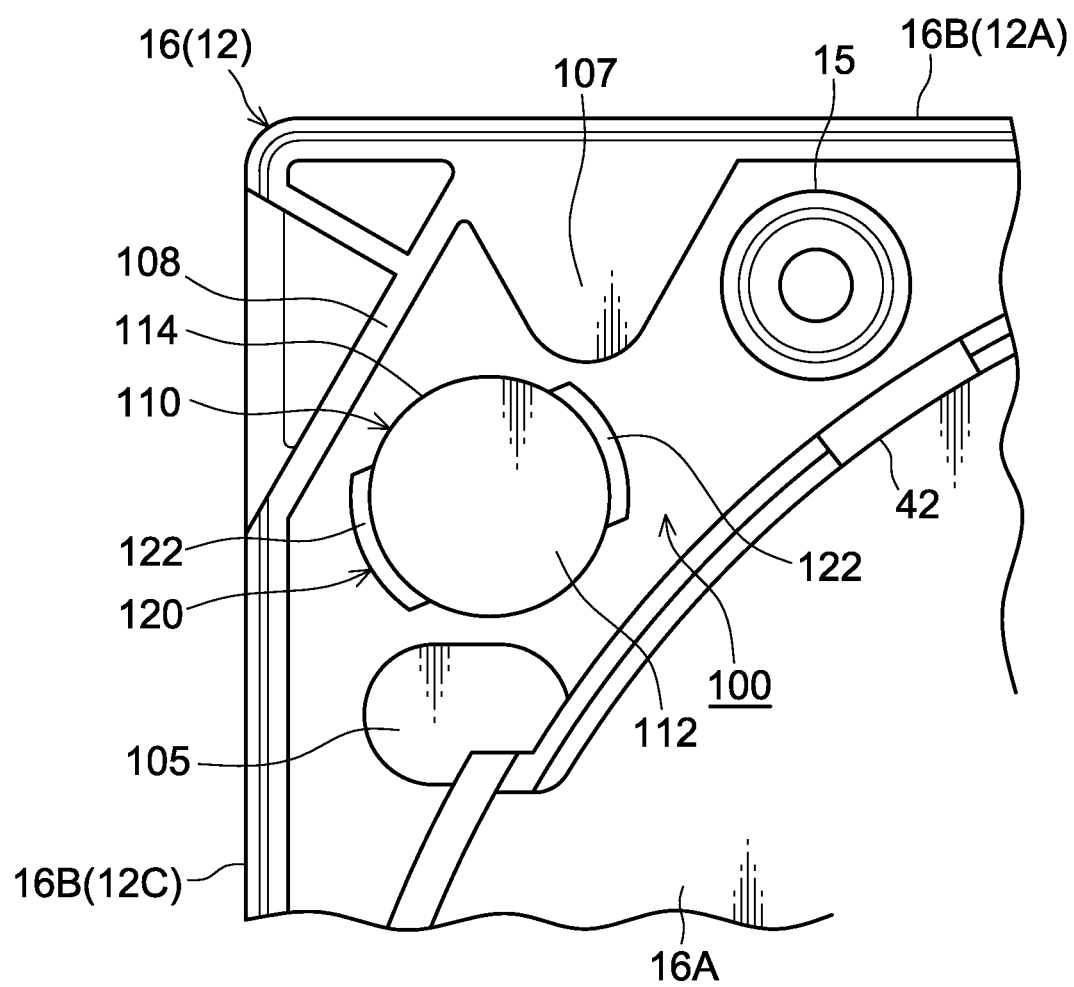
FIG. 6 is a schematic plan view of the lower case, that shows the holding portion relating to the first exemplary embodiment that is holding the security tag.

A jutting-out wall portion 107, that is substantially triangular in plan view and juts-out toward the rear, is formed at the inner surface of the front wall 12A (the peripheral wall 16B) by structuring the recess 106 (see FIG. 2). A rib 108 extends diagonally rearward and leftward at the left side wall of the jutting-out wall portion 107. The rib 108 is connected to a left wall 12C (the peripheral wall 16B) of the lower case 16 (see FIG. 4-6).

The space, that is surrounded by the rib 108, the jutting-out wall portion 107, the screw boss 15 at the front left corner portion of the case 12, the play restricting wall 42 and the pocket portion 105, is a setting space 100. A security tag 110 that will be described later is disposed within this setting space 100. The security tag 110 is held by a holding member 120 that will be described later.

The security function that is added to the recording tape cartridge 10 will be described next. Namely, the security tag 110, that is provided within the case 12 of the recording tape cartridge 10 in order to prevent the recording tape cartridge 10 from being transported-out from a predetermined security area, and the holding member 120, that relates to the first exemplary embodiment and holds the security tag 110, will be described.

The security tag 110 is structured overall in the shape of a cylinder, and has a solid-cylindrical magnetic core at whose both end portions flanges are formed, and a coil that is formed by winding a wire member around the outer peripheral surface of the magnetic core between the flanges. Lead terminal of capacitor is connected in parallel to the both ends of the winding, and the security tag 110 is structured so as to be able to transmit and receive to and from an emitting antenna and a receiving antenna (the exterior) that are provided at a gate (not shown) of a security area.

Namely, when the recording tape cartridge 10, in which the security tag 110 is incorporated, passes through the gate that is disposed so as to be oppose-manner at the entrance/exit of the security area, radio waves are transmitted and received between, on the one hand, the emitting antenna and the receiving antenna that are provided at the gate, and, on the other hand, the security tag 110 provided within the case 12 of the recording tape cartridge 10. The fact that the recording tape cartridge 10 has been transported-out of the security area is sensed.

Accordingly, if a system is provided that emits an alarm sound or the like from the security area (the gate or the like) due to this sensing, theft or inadvertent taking-out (transporting-out) of the recording tape cartridge 10 can be psychologically prevented. Note that, although the security tag 110 relating to the present exemplary embodiment is formed in a solid-cylindrical shape as shown in FIG. 2 and FIG. 3, the present invention is not limited to the same. Provided that the security tag is pillar or columnar (rod-shaped) that is easily assembled (easily fit-together with), the security tag may be formed, for example, in the shape of substantially solid-cylindrical that is non-complete round, a prism, tube or the like.

As specifically shown in FIGS. 4 to 7, a holding portion 120 is formed by a pair of ribs (projections) 122 formed integrally with and projecting (extending) from the inner surface of the floor plate 16A of the lower case 16 with a predetermined heightwise dimension (that is, a height to an extent of enabling holding the security tag 110) in such a manner as to cover, from the outer side, portions of the lower portion of the peripheral surface 114 of the security tag 110 which is placed vertically (placed such that the axial center of the security tag extends vertically) within the setting space 100 at a left-front corner portion of the lower case 16.

The pair of ribs 122 are formed such that they are circular-arc-shaped in plan view and that are faced and positioned at sides 180° opposite one another, Further, the pair of ribs 122 are formed such that the curvature thereof is made to be the same as the curvature of the peripheral surface 114 of the security tag 110 so that the ribs 122 run along the peripheral surface 114 of the security tag 110. A separated distance D at the longitudinal direction (peripheral direction) central portions of the ribs 122 is slightly smaller than the diameter R of the security tag 110. Due thereto, the security tag 110 can be fit-together between the pair of ribs 122.

In other words, the pair of ribs 122 can be made elastically deformable by the security tag 110 in the radial direction of the security tag. Due to the resilient restoration force of the ribs, the security tag 110 is adapted to be held. As a result, the security tag 110 has a structure in which the position of the security tag can be restricted (can be determined and held) such that the security tag 110 does not move along the inner surface of the floor plate 16A of the lower case 16 (in directions orthogonal to the vertical direction) and also does not move in the vertical direction.

Incidentally, "holding" in the present exemplary embodiment means restricting movement in at least one direction among the front-back direction, the left-right direction and the vertical direction (the so-called X-direction, Y-direction and Z-direction). Further, the ribs 122 are not limited to the structure in which a pair of ribs facing each other is provided in a projecting manner. For example, three or more ribs may be provided in a projecting manner at regular intervals, or a rib may be formed in a projecting manner so as to have a substantially C-shaped configuration when seen from the top with a slit portion which is cut in the vertical direction being formed in one place of the rib. In these cases, the ribs 122, not made to be annular, easily fit-together with the security tag 110.

Further, rather than the pair of ribs 122, a recess (not shown) into which the lower portion of the peripheral surface 114 of the security tag 110 is fit-together with may be formed in the inner surface of the floor plate 16A of the lower case 16, and this recess may be made to the holding portion of the security tag 110. The above-described holding portion 120 is desirably formed at a position at least separated from the peripheral wall 16B, the rib 108, and the play restricting wall 42, and further at a position separated from the screw boss 15, the pocket portion 105, the jutting-out wall portion 107 and the like. Further, the holding portion 120 may be provided in the upper case 14, or may be provided both in the upper case 14 and in the lower case 16.

Operation of the recording tape cartridge 10, that is structured as described above, is described next. When the recording tape cartridge 10 is not in use (is being stored or transported or the like), the opening 18 of the recording tape cartridge 10 is closed by the door 50. Due to the urging force of the compression coil spring 98, the braking member 80 is positioned at the rotation-locked position, and the engaging gears 48 are made to mesh-together with the braking gear 84. Therefore, rotation of the reel 20 with respect to the case 12 is impeded.

On the other hand, when the recording tape T is to be used, the recording tape cartridge 10 is loaded into a drive device along the direction of arrow A with the front wall 12A leading. As a result, first, the opening/closing member provided at the drive device engages with the convex portion 56 of the door 50. When the recording tape cartridge 10 is moved further in the direction of arrow A in this state, the opening/closing member moves the convex portion 56 relatively rearward against the urging force of the coil spring 58.

As a result, the door 50, from which the convex portion 56 projects, slides rearward within the groove portions 64 along the right wall 12B, and opens the opening 18. Further, at this time, the position restricting member provided in the drive device engages with the recess 106 formed in the front wall 12A of the case 12 (the lower case 16). The position (depth) of the recording tape cartridge 10 in the loading direction is thereby restricted.

When the recording tape cartridge 10 is loaded to a predetermined depth in the drive device and the opening 18 is completely opened in this way, the recording tape cartridge 10 is lowered a predetermined height, and the positioning members of the drive device are inserted into the holes 102, 104 for positioning that are formed in the lower case 16. Due thereto, the recording tape cartridge 10 is accurately positioned at a predetermined position within the drive device, and further sliding of the door 50 (further movement of the door 50 rearward) is restricted.

Due to the operation of the recording tape cartridge 10 being lowered, the rotating shaft relatively enters-in from the gear opening 40 and causes the driving gear to mesh with the reel gear 44. Accompanying the operation of the meshing-together of the driving gear with the reel gear 44, the leg portions 94 that project above the reel gear 44 are pushed-up against the urging force of the compression coil spring 98, the braking member 80 is pushed-up via the releasing member 90, and the meshing of the braking gear 84 and the engaging gears 48 is released.

Then, in the state in which the driving gear and the reel gear 44 are completely meshed-together, the reel plate 46 is attracted to and held by the magnetic force of the annular magnet provided at the radial direction inner side of the driving gear. Due thereto, the reel 20 is set in a locking released state in which relative rotation thereof with respect to the case 12 becomes possible within the case 12, while the meshing of the reel gear 44 with the driving gear is maintained.

On the other hand, the pull-out member provided at the drive device enters into the case 12 from the opening 18 that has been opened, and grasps and pulls-out the leader pin 30 that is positioned and held at the pin holding portions 36. Note that, at this time, because the recording tape cartridge 10 is positioned accurately within the drive device, the pull-out member can cause the hooks thereof to anchor on the annular grooves 32 of the leader pin 30. Further, because the rotation-locked state of the reel 20 is released, the reel 20 can rotate accompanying the operation of pulling-out of the leader pin 30.

The leader pin 30, that is pulled-out from the opening 18 in this way, is accommodated on an unillustrated take-up reel. Then, due to the take-up reel and the reel 20 being driven and rotated synchronously, the recording tape T is pulled-out successively from the case 12 while being taken-up onto the take-up reel, and recording or playback of information is carried out by a recording/playback head (not illustrated) that is disposed along a predetermined tape path.

When the recording tape cartridge 10, for which recording or playback of information is finished, is to be discharged from the drive device, first, due to the rotating shaft rotating reversely, the recording tape T is rewound onto the reel 20. Then, when the recording tape T has been rewound to the end thereof onto the reel 20 and the leader pin 30 is held at the pin holding portions 36, the recording tape cartridge 10 is raised a predetermined height, the positioning members are pulled-out from the holes 102, 104 for positioning, the rotating shaft is pulled-out from the gear opening 40, and the meshing-together of the driving gear with the reel gear 44 is cancelled.

As a result, due to the urging force of the compression coil spring 98, the braking member 80 and the releasing member 90 are pushed downward, the leg portions 94 are inserted-through the through-holes 28A and project-out a predetermined height above the reel gear 44 from the bottom surface of the floor wall 28, and the braking gear 84 meshes-together with the engaging gears 48. The reel 20 is thereby again set in a rotation locked state in which relative rotation thereof within the case 12 is impeded. Thereafter, the recording tape cartridge 10 is moved in the direction opposite the direction of arrow A by an unillustrated ejecting mechanism.

Accompanying this movement, the door 50 slides in the direction of closing the opening 18 due to the urging force of the coil spring 58, and completely closes the opening 18 (returns to its initial state). The recording tape cartridge 10, at which the relative rotation of the reel 20 with respect to the case 12 is locked and the opening 18 is closed in this way, is completely ejected from the interior of the drive device.

Here, if the recording tape cartridge 10 that is ejected from the drive device is transported-out from a predetermined security area, an alarm sound is issued, and the transporting-out is prevented. Namely, the security tag 110, that can transmit and receive to and from the exterior, is provided within the case 12 of the recording tape cartridge 10.

Accordingly, when the recording tape cartridge 10 passes-through the gate provided at the entrance/exit of the security area, radio waves are transmitted and received between, on the one hand, the security tag 110, and, on the other hand, the emitting antenna and receiving antenna that are provided at the gate, and the transporting of the recording tape cartridge 10 out of the security area is sensed. Accordingly, if an alarm sound is generated, for example, from the gate or the like due to this sensing, theft or inadvertent taking-out (transporting-out) of the recording tape cartridge 10 can be psychologically prevented.

Due to the security tag 110 being fit-together with between the pair of ribs 122 which forms the holding portion 120, the security tag 110 is positioned and held in the case 12 (the lower case 16), and movement of the security tag in the vertical direction and in directions orthogonal to the vertical direction is restricted. Accordingly, as compared to a case in which a holding member (not shown) for holding the security tag 110 is provided additionally, the position at which the security tag 110 is located in the case 12 can be stabilized with a higher degree of precision.

As a result, variations in communication distance for each product can be restrained, and the quality can be stabilized. Accordingly, the accuracy of communication of the security tag 110 with the emitting antenna and the receiving antenna that are provided at the gate can be improved, and it can be reliably sensed that the recording tape cartridge 10 has passed through the gate.

Further, it is not necessary to separately provide a holding member for holding the security tag 110, and therefore, it is possible to prevent an increase in parts production costs caused by increase in the number of parts, and also prevent deterioration of production efficiency caused by an increase in the number of assembling processes. Furthermore, the ribs 122 are formed integrally with the case 12 (the lower case 16), and therefore, as compared to a structure in which the holding member is provided separately, durability can be improved.

In other words, the holding member to provided separately is preferably made from a resin material (for example, PP) whose strength is lower than the case 12, and therefore, it is weak to a heavy environment such as an impact or temperature and humidity as compared to the resin material (for example, PC) that forms the case 12. Accordingly, due to the holding portion 120 being formed by the ribs 122 formed integrally with the case 12 (the lower case 16), the holding portion 120 (the ribs 122) can be allowed to have a durability similar to that of the case 12.

Further, the security tag 110 is structured so as to be fit-together with between the pair of ribs 122 from the upper side (from the vertical direction). Accordingly, the security tag 110 is easily incorporated into the setting space 100 of the lower case 16. That is to say, due to the above-described structure, assembly (incorporatability) of the security tag 110 into the case 12 is excellent, thereby resulting in that assembly of the entire recording tape cartridge 10 can be improved.

Moreover, the ribs 122 are simply formed integrally with the case 12 (the lower case 16), and therefore, the degree of freedom of a position at which the security tag 110 is located can be enhanced. Accordingly, it becomes possible to locate the security tag 110 sufficiently apart from metal parts such as a screw (so as not to interfere with the metal parts), and it is also possible to prevent deterioration of communication performance of the security tag 110 due to the metal parts.

Furthermore, it becomes possible to locate the security tag 110 at least away from the left side wall (the peripheral wall 16B) of the case 12, the lib 108 and the like, desirably, away from the screw boss 15, the pocket portion 105, the jutting-out wall portion 107 and the like. Therefore, for example, when the recording tape cartridge 10 accidentally falls down, damage of the security tag 110 caused by the security tag colliding with the left side wall 12C, the screw boss 15 and the like can be restrained or prevented.

As described above, if only the holding portion 120 (the pair of ribs 122) in which the security tag 110 is fit-together with and held is formed integrally with the lower case 16 (the case 12), the recording tape cartridge 10, to which a high-performance security function is added for preventing theft from a security area, can be obtained simply and inexpensively. Theft or inadvertent taking-out (transporting-out) of the recording tape cartridge 10 from a predetermined security area can be reliably prevented.

Figure 8:
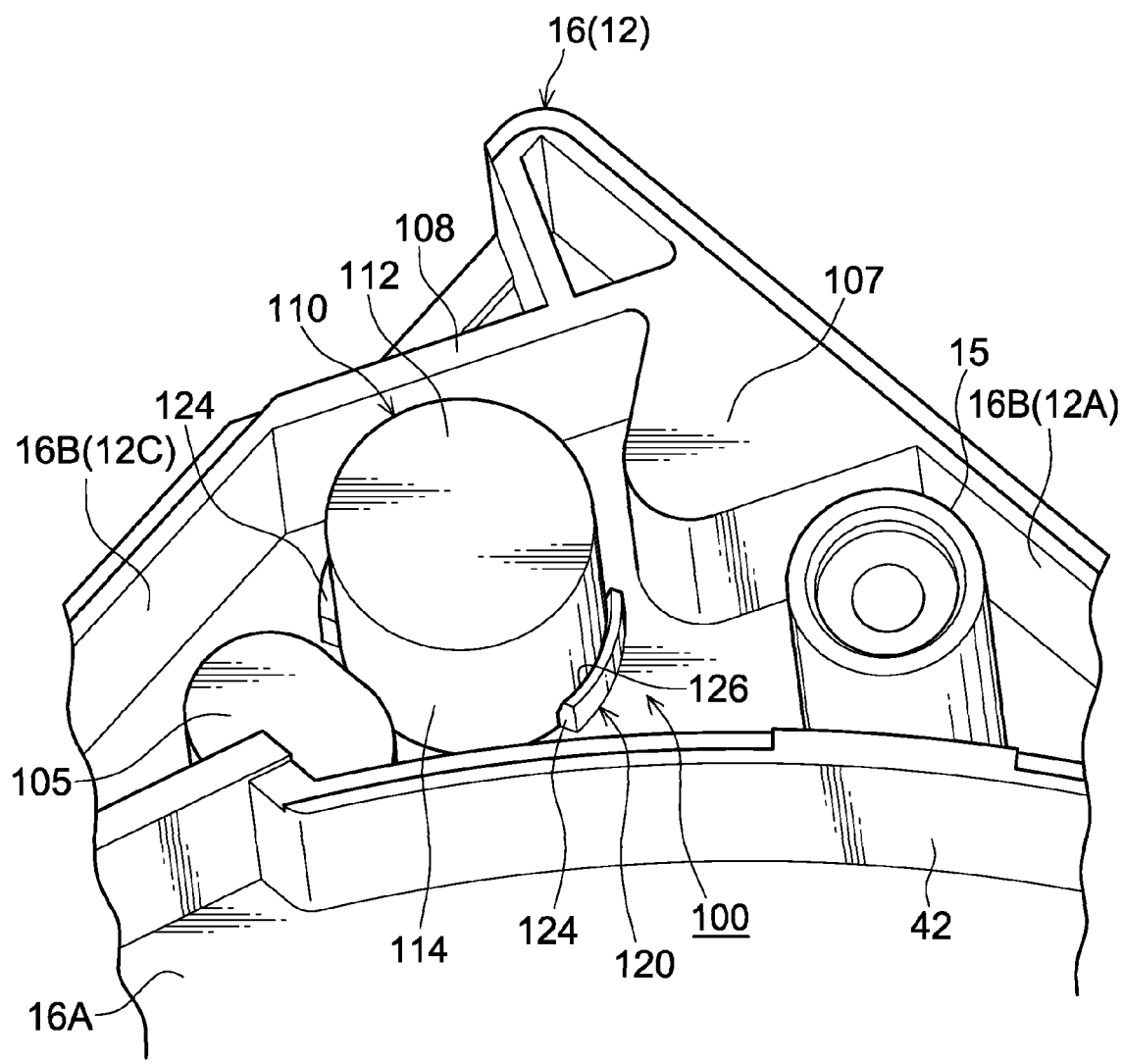
FIG. 8 is a schematic perspective view of the lower case, that shows the holding portion relating to the second exemplary embodiment that is holding the security tag.
Figure 9:
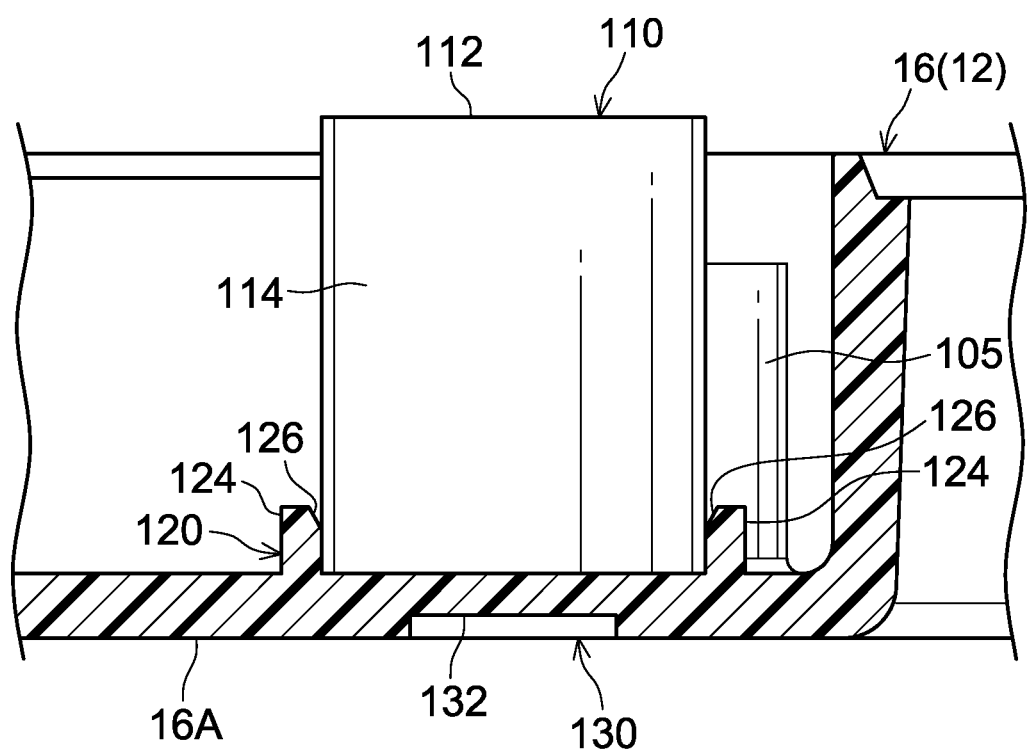
FIG. 9 is a schematic plan view of the lower case, that shows the holding portion relating to the second exemplary embodiment that is holding the security tag.

Next, a holding portion 120 according to a second exemplary embodiment is described on the basis of FIG. 8 and FIG. 9. Note that, in FIG. 8 and FIG. 9, regions that are similar to those of the first exemplary embodiment are denoted by the same reference numerals and detailed description thereof (including description of the operation thereof) is omitted. The holding portion 120 according to the second embodiment is formed by a pair of ribs 124 whose dimension and shape are determined such that the security tag 110 is fit-together with between the ribs by press-fitting.

That is to say, the pair of ribs 124 are formed integrally with and projecting from the inner surface of the floor plate 16A of the lower case 16 with a predetermined heightwise dimension (which is smaller than that of the ribs 122 of the first embodiment) and a predetermined thickness (which is larger than that of the ribs 122 of the first embodiment) in such a manner as to cover, from the outer side, portions of the lower portion of the peripheral surface 114 of the security tag 110 which is placed vertically within the setting space 100. The pair of ribs 124 are formed such that they are circular-arc-shaped in plan view and that are faced and positioned at sides 180° opposite one another.

Further, the pair of ribs 124 are formed such that the curvature thereof is made to be the same as the curvature of the peripheral surface 114 of the security tag 110 so that the ribs 124 run along the peripheral surface 114 of the security tag 110. A separated distance D (refer to FIG. 4) at the longitudinal direction (the peripheral direction) central portions of the ribs 124 is slightly smaller than the diameter R of the security tag 110 (smaller than the separation distance D of the ribs 122 of the first embodiment).

Accordingly, the security tag 110 is fit-together with between the pair of ribs 124 by press-fitting. As shown in FIG. 9, a tapered surface 126 serving as a guide surface that guides press-fitting of the security tag 110 is formed on the upper portion inner surface of each of the ribs 124. As a result, the security tag 110 is structured so as to be easily fit-together with by press-fitting between the pair of ribs 124, and the security tag 110 is held by being pressed in the radial direction relatively with respect to the lower portion inner surface of each of the ribs 124.

Figure 10:
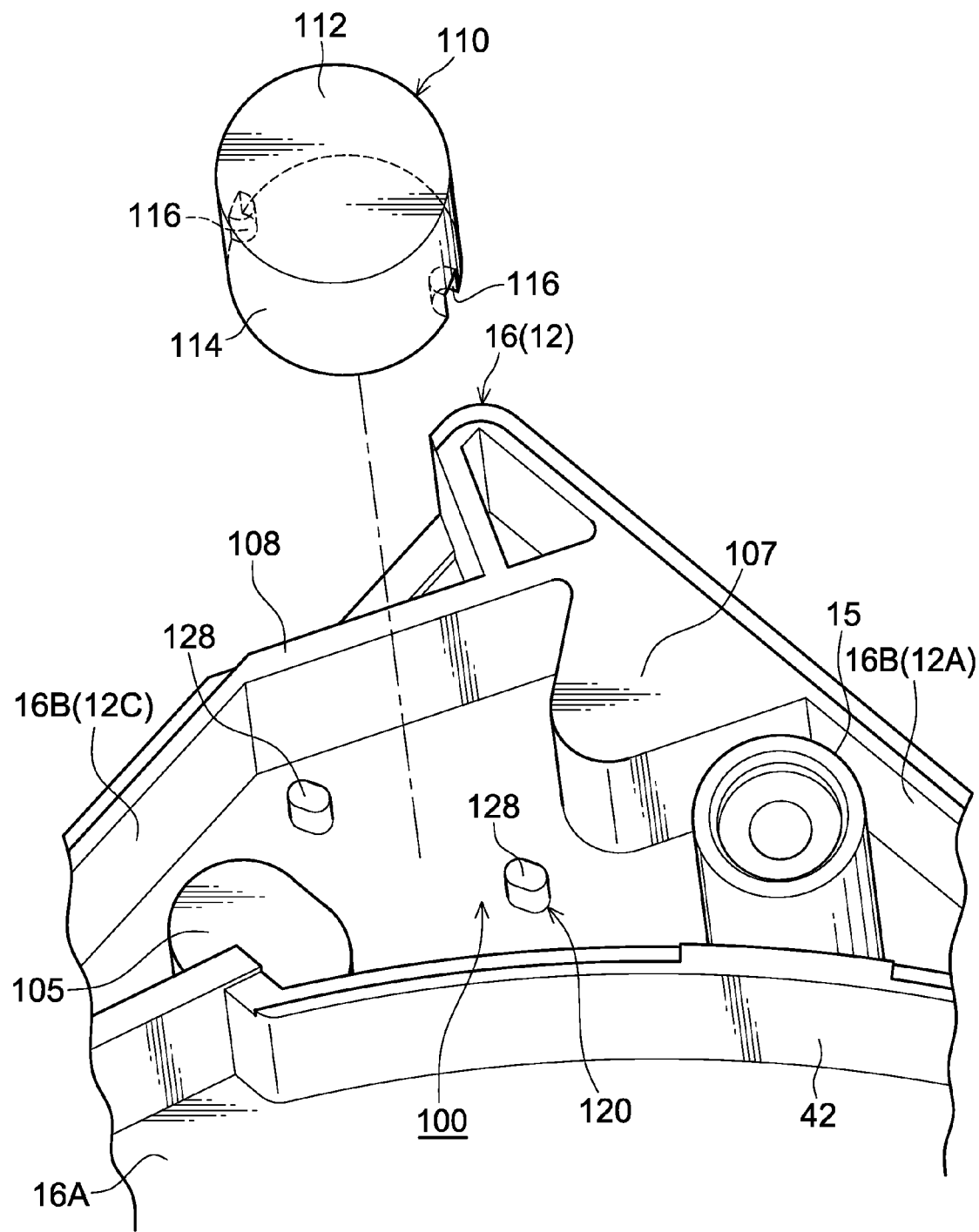
FIG. 10 is a schematic perspective view of the lower case at which ribs, that restrict the position of the security tag, are formed.
Figure 11:
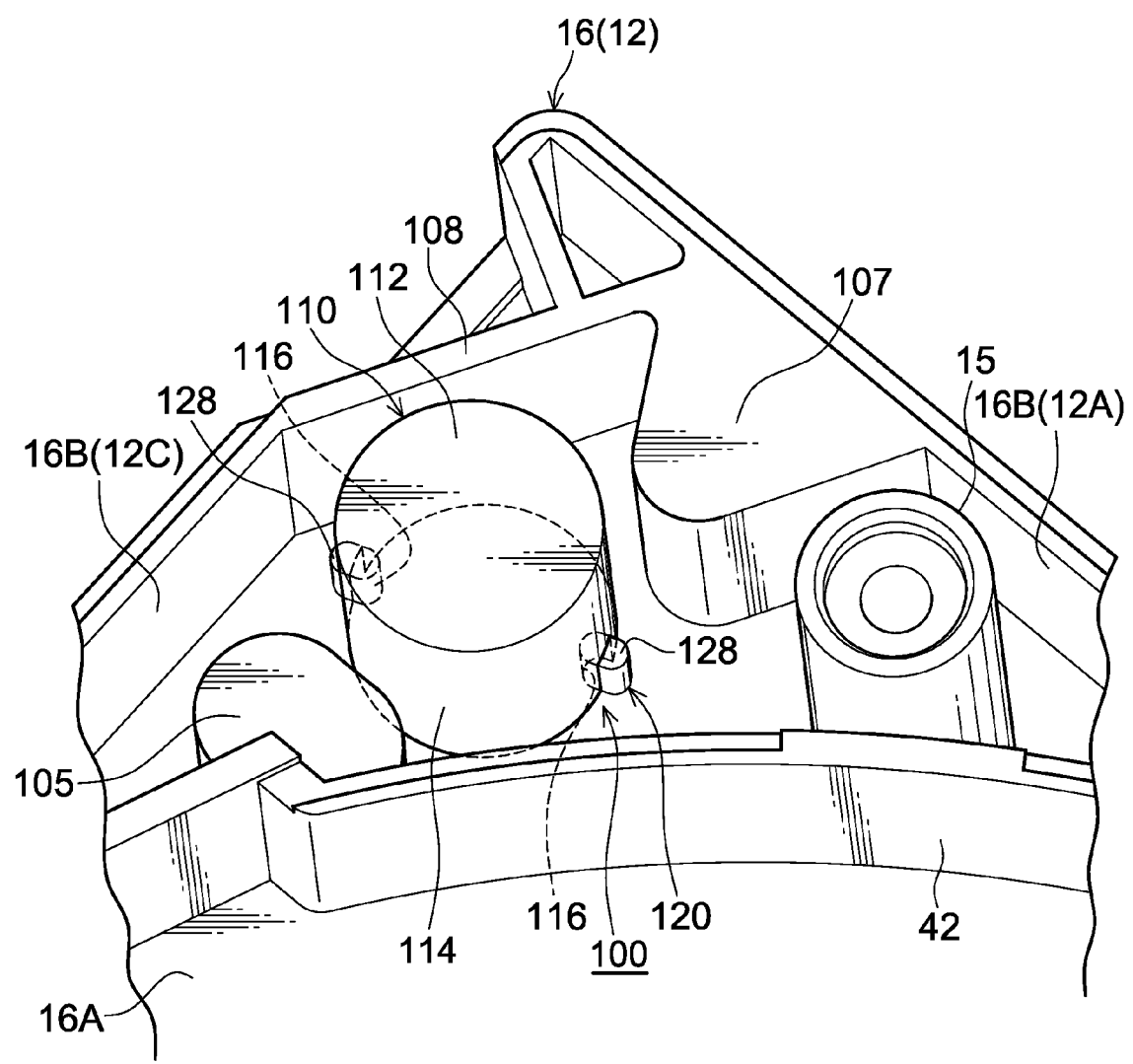
FIG. 11 is a schematic perspective view of a holding portion relating to a third exemplary embodiment.
Figure 12:
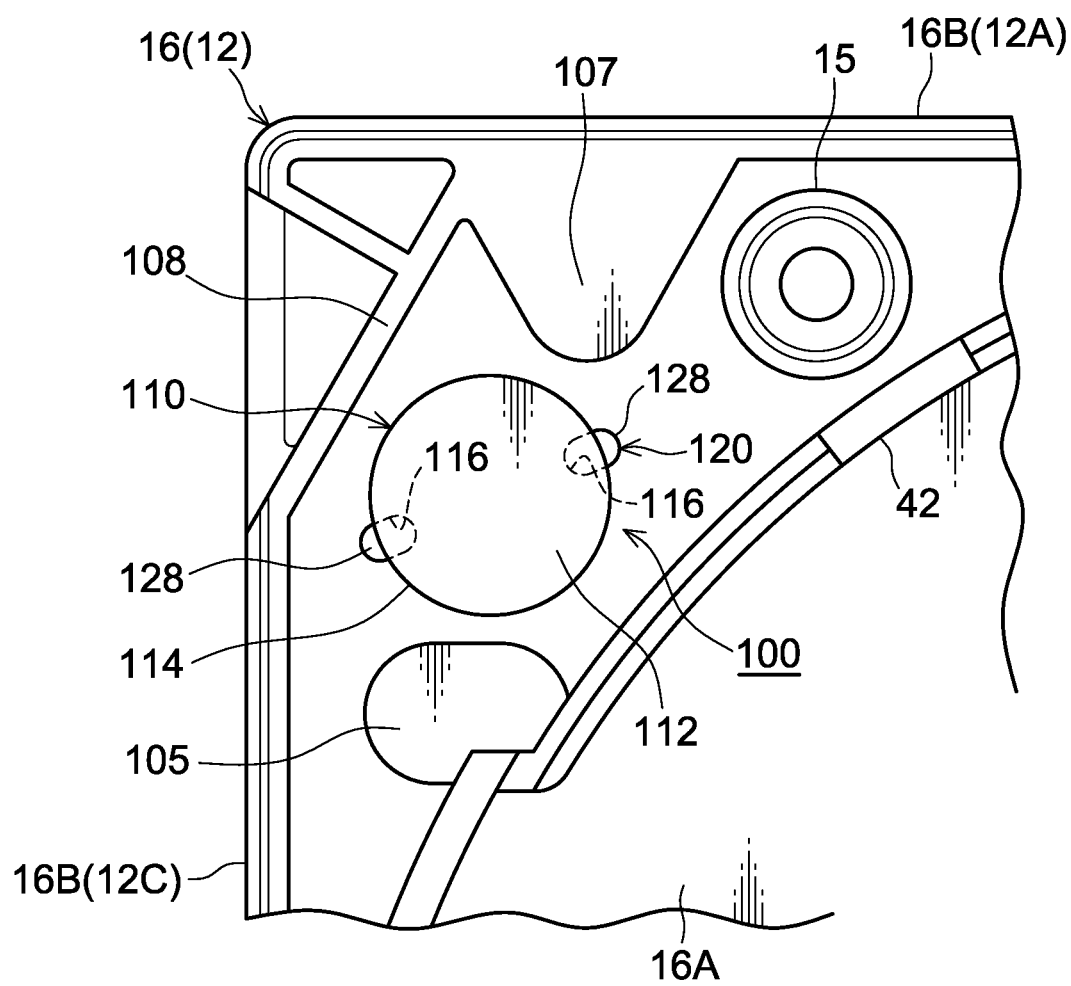
FIG. 12 is a schematic perspective view of the lower case, that shows the holding portion relating to the third exemplary embodiment that is holding the security tag.

Next, a holding portion 120 according to a reference example is described on the basis of FIG. 10 to FIG. 12. Note that, in FIG. 10 to FIG. 12, regions that are similar to those of the first exemplary embodiment are denoted by the same reference numerals and detailed description thereof (including description of the operation thereof) is omitted. The holding portion 120 according to the reference example is formed by a pair of convex portions 128 which can be fit-together with by press fitting, respectively, a pair of notch portions 116 formed at the lower portion peripheral edge of the security tag 110.

In other words, at the peripheral edge in the lower portion of the security tag 110, one pair of the notch portions 116 each having substantially a semicircular configuration when seen from the bottom are formed at sides 180° opposite one another. A pair of the convex portions 128 which each have substantially a circular or elliptical configuration when seen from the top and of which outer shape is larger than each of the notch portions 116 are provided so as to project from the inner surface of the bottom plate 16A of the lower case 16 within the setting space 100, so as to correspond to a separation distance between the notch portions 116 (the diameter of the security tag 110).

Accordingly, by the notch portions 116 of the security tag 110 being respectively fit-together with the convex portions 128, the security tag 110 is positioned and held in the lower case 16 (the case 12). The shape of the notch portion 116 and the shape of the convex portion 128 are not limited to the illustrated shapes. As long as the notch portion 116 and the convex portion 128 are formed so as to fit-together each other by press-fitting, any optional shapes thereof may be used.

In the foregoing, the recording tape cartridge 10 relating to the exemplary embodiments has been described above, but the recording tape cartridge 10 relating to the exemplary embodiments is not limited to the illustrated examples, and appropriate changes in design can be made thereto within a scope that does not deviate from the gist of the present invention. For example, the heightwise dimension of the ribs 124 of the second embodiment may be made same to that of the ribs 122 of the first embodiment. However, the ribs 122 which hold the security tag 110 with their resilient restoration force is desirably formed smaller in the thickness and larger in the heightwise dimension.

Further, the shapes of the ribs 122, 124 each forming the holding portion 120 are not limited to the illustrated shapes. For example, in a case in which the security tag 110 is placed horizontally (the axial center thereof is disposed in a direction orthogonal to the vertical direction), the shapes of the ribs 122 and 124 may be suitably designed and changed correspondingly.

Moreover, the holding portion 120 according to the present embodiment is formed by one pair of ribs 122, 124, which ribs are provided so as to project from the lower case 16 (the case 12). This structure can address (correspond) to a state in which the heightwise dimension of the security tag 110 is changed, and even if the diameter of the security tag 110 is changed, the security tag 110 can be positioned and held, correspondingly, by the distance between the pair of ribs 122 or between the pair of ribs 124 being suitably changed.

In order to psychologically prevent the transporting of the recording tape cartridge 10 out from a security area, the recording tape cartridge 10 may be made such that the recognition portion 130 which makes it possible to recognize the recording tape cartridge 10 having the built-in security tag 110 from the outside is formed in the case 12.

Figure 7:
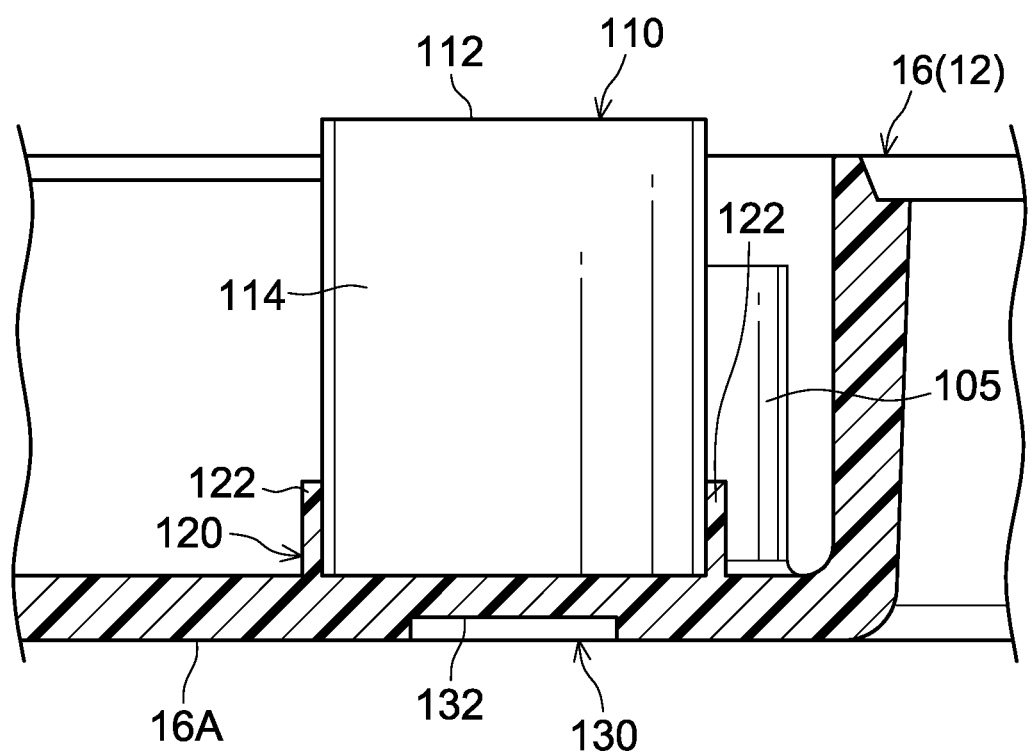
FIG. 7 is a schematic perspective view of a holding portion relating to a second exemplary embodiment.
Figure 13:
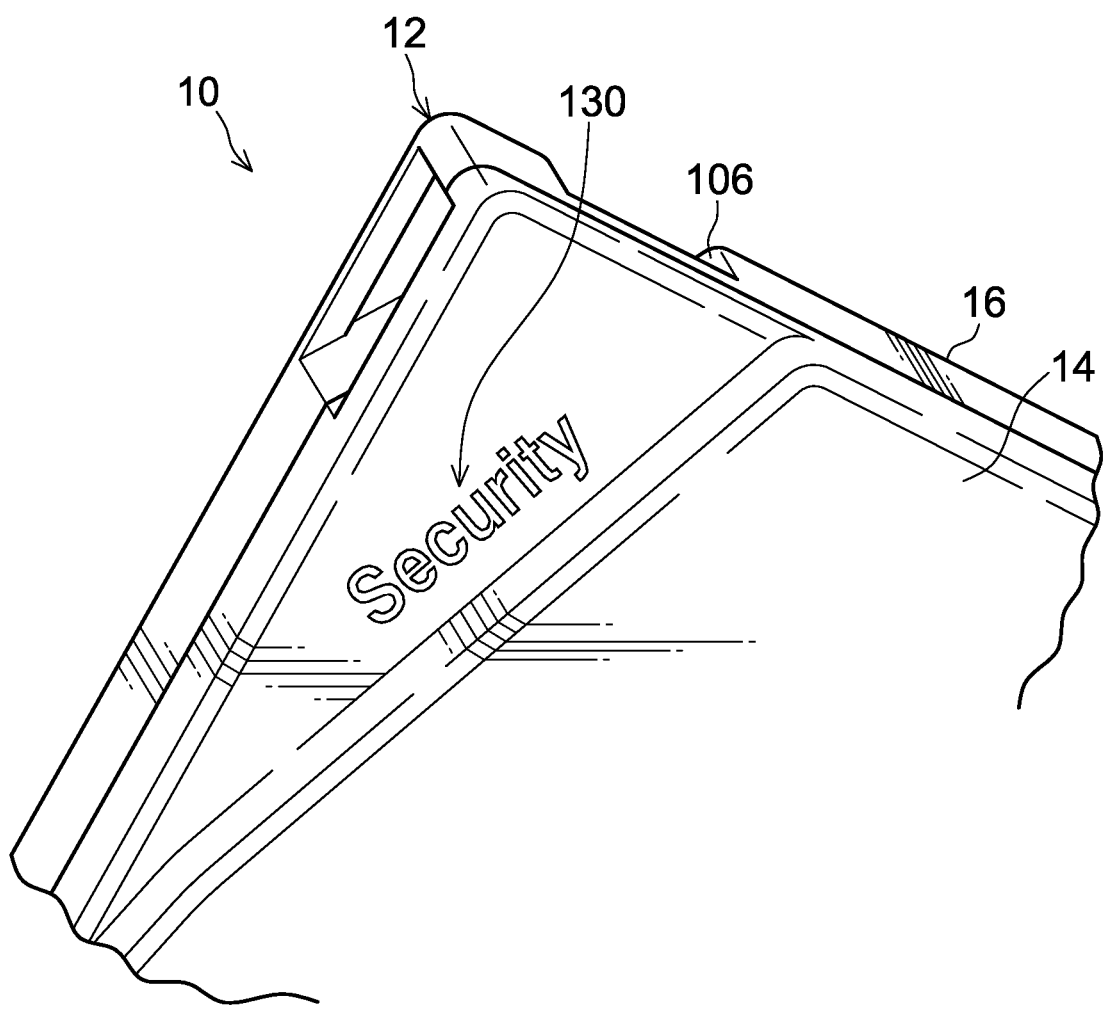
FIG. 13 is a schematic plan view of the lower case, that shows the holding portion relating to the third exemplary embodiment that is holding the security tag.
Figure 14:
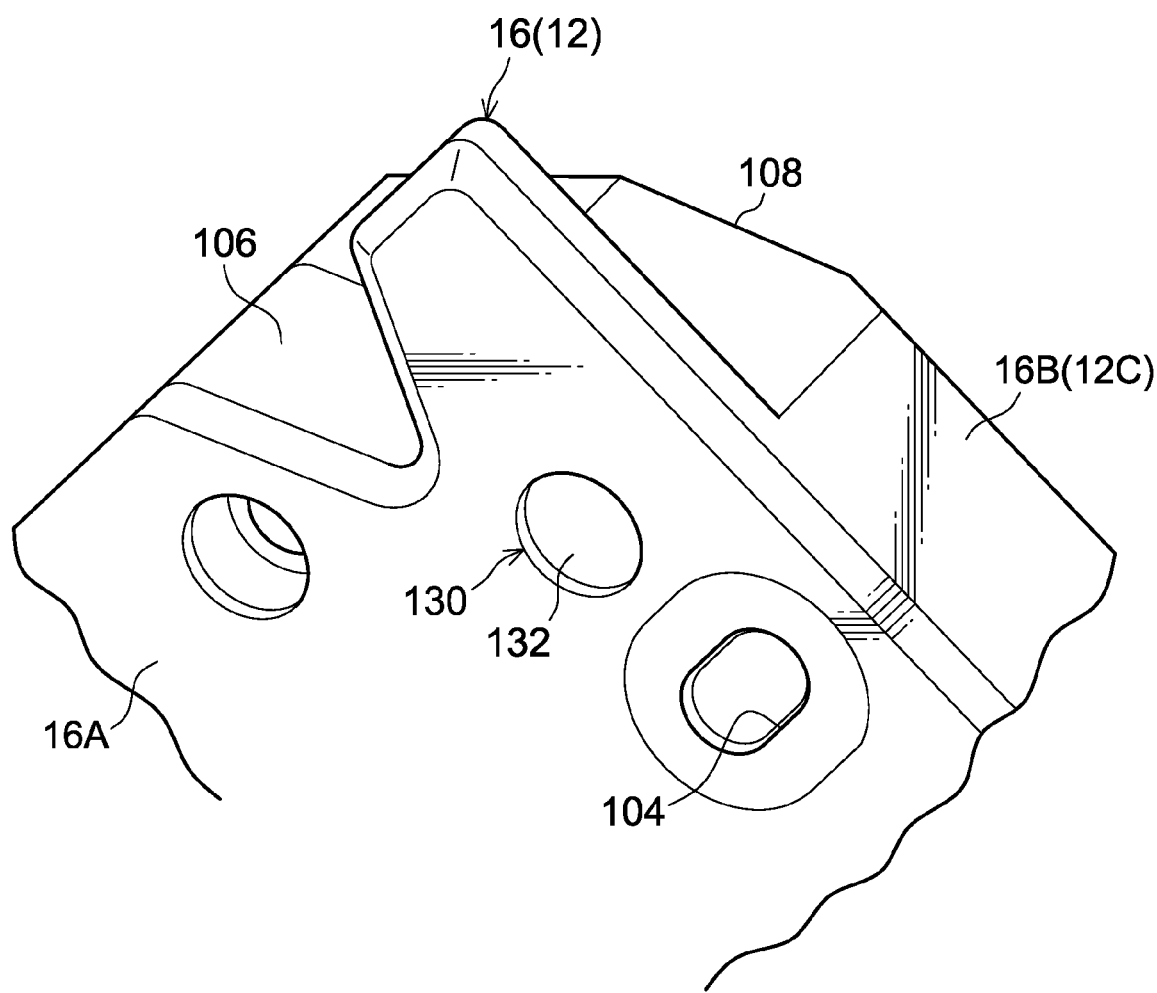
FIG. 14 is a schematic perspective view of the case on which is printed a word indicating that a security tag is incorporated therein.

That is to say, for example, as shown in FIG. 13, a word such as "Security" may be printed, engraved or the like on the ceiling surface of the case 12 (the outer surface of the ceiling plate 14A of the upper case 14), or, as shown in FIGS. 7, 9, 14, a recess portion 132 or the like may be formed at the floor (bottom) surface of the case 12 (the outer surface of the floor plate 16A of the lower case 16) and at immediately below the position at which the security tag 110 is disposed.

In a case in which the recognition portion 130 is the recess portion 132, there is an advantage that occurrence of sink in the resin material, which results from that the thickness of the floor plate 16A of the lower case 16 increases due to the ribs 122, 124, can be prevented. Further, when the recognition portion 130 is formed on the floor surface of the case 12 and immediately below the position at which the security tag 110 is disposed (or formed on the top surface of the case 12 and immediately above the position at which the security tag 110 is disposed), the position of the security tag 110 can be specified from outside of the case 12, and therefore, there is an advantage that operation check of the security tag 110, and the like can be reliably performed.

In addition, a position restricting member which restricts movement of the security tag 110, for example, a holding member (not shown) or the like, of which one end portion is covered on the top surface 112 of the security tag 110 and other end portion is fit-together with by press-fitting the screw boss 15 used to join the upper case 14 and the lower case 16 to each other with a screw, also may be provided separately from the holding portion 120. Due to the above-described structure, movement of the security tag 110 in the vertical direction and in directions orthogonal to the vertical direction can be further regulated.

Further, although the exemplary embodiments describe the recording tape cartridge 10 for data backup in which the single reel 20 is accommodated within the case 12, the present invention can, of course, be applied as well to recording tape cassettes for video taping, or the like, in which two reels are accommodated within a case.

It suffices for the recording tape T that is wound on the reel 20 to be understood as an elongated, tape-shaped information recording/playback medium on which information can be recorded and from which recorded information can be played-back. The recording tape cartridge 10 that accommodates the reel 20 can, of course, be applied to recording tapes T of any recording/playback formats.

What is claimed is:

1. A recording tape cartridge comprising:
a case that accommodates a reel on which a recording tape is wound;
a security tag having a substantially pillar shape, that is provided within the case, and that is adapted to transmit to and receive radio waves from an exterior; and
a holding portion formed in the case, that holds the security tag by having the security tag fitted with the holding portion; wherein
the holding portion comprises a projection portion including a first projection projected from the case and a second projection projected from the case,
a distance between the first projection and the second projection is smaller than a dimension of the security tag in a direction orthogonal to a fit-direction in which the security tag is fitted, and
the security tag is fitted between the first projection and the second projection, with the first projection and the second projection being elastically deformed.

2. The recording tape cartridge of claim 1, wherein the security tag is fitted with the projection portion by being pressed into the projection portion, and the projection portion comprises a guide surface that guides the security tag being pressed into the projection portion.

3. The recording tape cartridge of claim 1, wherein the security tag is fitted between the first projection and the second projection by being pressed between the first projection and the second projection, and the first projection and the second projection comprise guide surfaces that guides the security tag being pressed between the first projection and the second projection.

4. The recording tape cartridge of claim 3, wherein, at an upper portion of each of the first and the second projections, a tapered surface is formed that guides the security tag being pressed between the first and the second projections.

5. The recording tape cartridge of claim 1, wherein the case comprises an upper case and a lower case, and the projection portion is formed in at least one of the upper case and the lower case.

6. The recording tape cartridge of claim 5, wherein the security tag is fitted between the first projection and the second projection such that an axial center of the security tag extends vertically with respect to the upper case and the lower case.

7. The recording tape cartridge of claim 1, wherein a recognition portion, by which it can be recognized from an exterior that the security tag is provided in the recording tape cartridge, is formed in the case.

8. The recording tape cartridge of claim 7, wherein the recognition portion is formed immediately below or immediately above the projection portion.

9. The recording tape cartridge of claim 8, wherein the recognition portion is a recessed portion formed at an outer surface of the case.

10. The recording tape cartridge of claim 1, wherein a notch portion is formed in the security tag, and the notch portion is fitted with the projection portion.

* * * * *